No. 786,051. PATENTED MAR. 28, 1905.
D. R. ROBERTSON.
PROCESS OF REDUCING ORES.
APPLICATION FILED AUG. 30, 1904.
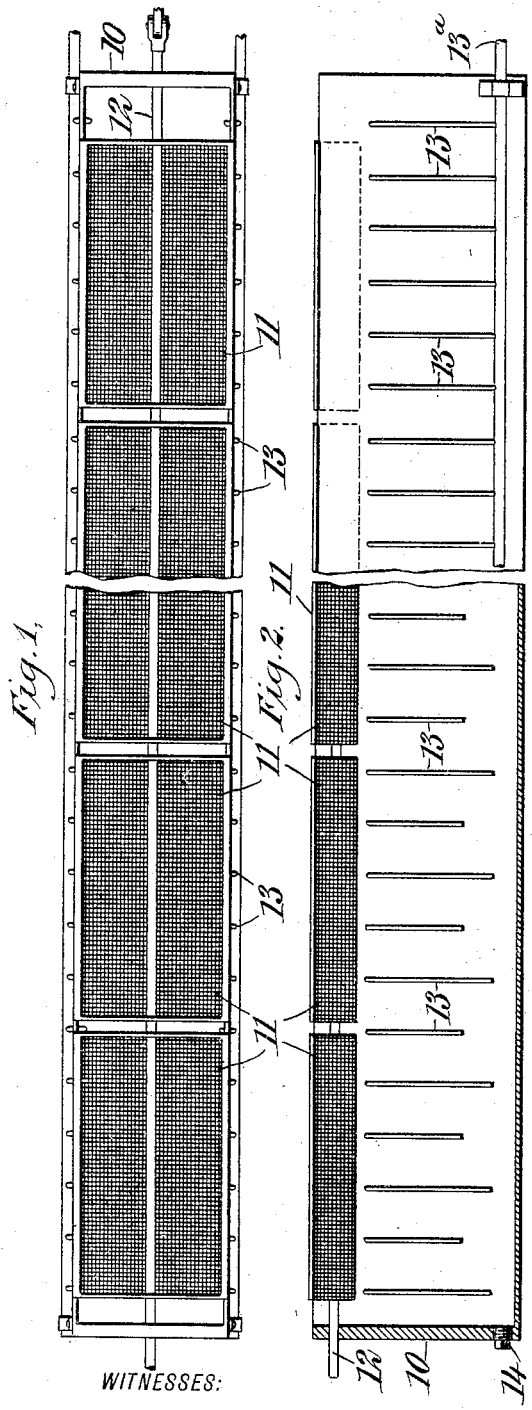
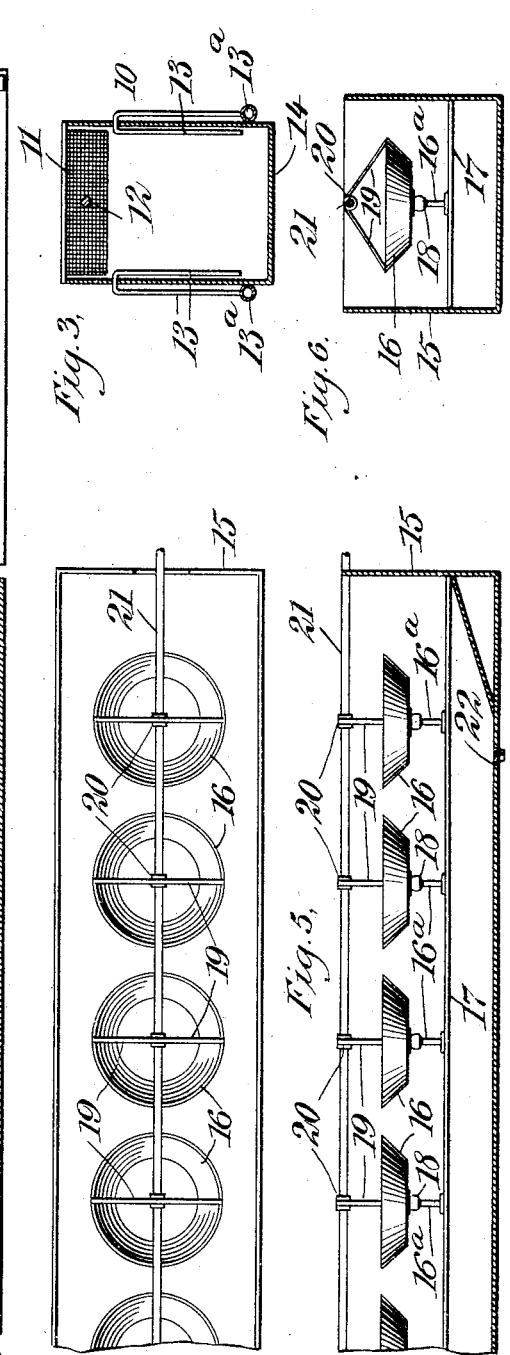
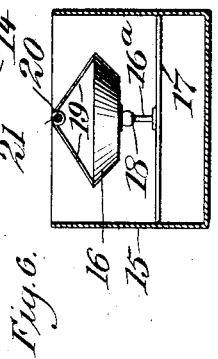
WITNESSES:
Edward Thorpe.
INVENTOR
Dennis R. Robertson
BY
ATTORNEYS No. 786,051.

Patented March 28, 1905.

UNITED STATES PATENT OFFICE.

DENNIS RICHERD ROBERTSON, OF LEADVILLE, COLORADO.

PROCESS OF REDUCING ORES.

SPECIFICATION forming part of Letters Patent No. 786,051, dated March 28, 1905.

Application filed August 30, 1904. Serial No. 222,722.

*To all whom it may concern:*

Be it known that I, DENNIS RICHERD ROBERTSON, a citizen of the United States, and a resident of Leadville, in the county of Lake and State of Colorado, have invented a new and Improved Process of Reducing Ores, of which the following is a full, clear, and exact description.

My invention relates to processes for separating the values of ores, placer-dirt, sand, and other materials, it being particularly applicable to those containing gold, silver, and copper. Its objects are to provide a ready method of effectively releasing and recovering the values.

It consists in the various steps hereinafter described and claimed.

Reference is to be had to the accompanying drawings, forming a part of this specification, in which similar characters of reference indicate corresponding parts in all the figures.

Figure 1 is a broken top plan view of a portion of an apparatus which may be employed in carrying out my process. Fig. 2 is a broken sectional elevation thereof. Fig. 3 is a transverse section therethrough. Fig. 4 is a broken top plan view of another portion of such an apparatus. Fig. 5 is a longitudinal section therethrough, and Fig. 6 is a transverse section of the same.

To aid in carrying out my improved process, I preferably provide a tank 10, usually of heavy sheet-iron, at the upper portion of which are supported baskets 11 of some suitable perforated or reticulated material. Through these baskets passes a rod 12, which may be moved in any desired manner to reciprocate the baskets. This tank 10 is partially filled with water, preferably for about half its depth, and for the treatment of a ton of material there is mixed with and dissolved in it one fluid ounce of ammonia, one pound of saltpeter or potassium nitrate, and five pounds of rock-salt or crude sodium chlorid. The baskets are then started in motion and the material, in such a finely-divided state that the values are released, is slowly fed into them and, passing through the openings, is uniformly distributed through the fluid. After a certain time, preferably about an hour, there is added to the contents of the tank iron salts in the form of one pound of sulfate of iron and iron oxid, this latter preferably consisting of "iron-water" to the amount of five gallons, which has been previously made by covering scrap-iron with water and permitting it to stand for twenty-four to forty-eight hours, and also an acid, for which I prefer to employ nitric acid, one ounce. The mixture is then simultaneously agitated and heated by forcing into it for about thirty minutes hot air, introduced by branch pipes 13, extending downward at intervals along each side of the tank and leading from a main pipe $13^a$. These branch pipes preferably have their lower open extremities spaced alternately at different distances from the bottom 14 of the tank to more effectively distribute the agitating effect. The main pipes are connected to a suitable compressor or other source of hot air. The tank is next covered for an hour or two, and when the cover is removed it will be found that the free metal will have been caused to cohere and is floating upon the surface. The contents of the tank is again agitated for, say, ten minutes, whereupon these values will be precipitated upon the pulp at the bottom of the tank. After resting for half an hour the liquid is drained off through a suitably-plugged opening at 14, and sufficient cold water is introduced to cover the solid material. This is let stand for a sufficient time to cool, when the water is drawn off and the residue is ready for washing. For this purpose I have shown a tank 15, which may be of any suitable size and material and contain a series of receptacles or pans 16, preferably of sheet-iron and of inverted-frusto-conical shape. These receptacles are supported upon standards $16^a$, rising at intervals from the inner frame or bottom 17 by a ball-and-socket or similar joint 18. From the opposite edges of each receptacle at the top are converging arms 19 19, connected to collars 20, surrounding a rod 21, extending longitudinally of the tank, and which may be reciprocated laterally in any convenient manner to oscillate the receptacles. The pulp carrying the reduced metal is placed in the receptacles and sufficient water introduced into the tank to cover it. The washing is then thoroughly done by oscillating the receptacles for a sufficient length of time. When this has been properly accomplished, the liquid is withdrawn from the tank through a plugged opening 22, and the pulp is transferred to a suitable drier and the contained moisture driven off. The material is now ready for smelting or other treatment to secure the values.

The ammonia employed in carrying out my process softens the water; the potassium nitrate prevents the escape of gases and fumes which in metallurgical operations carry off so large a proportion of the values; the rock-salt assists in retaining the heat; the sulfate of iron acts as a precipitant and the iron-water and nitric acid as purifiers, and these together, in association with the increase of temperature, release the metal from the gangue and then cause it to be deposited upon the pulp.

It should be noted that by my process the values are not only very completely recovered, but that it acts simultaneously to separate the gold, silver, and copper contained in the material.

Having thus described my invention, I claim as new and desire to secure by Letters Patent—

1. The process for reducing ore, which consists in subjecting the finely-divided material in the presence of water to the action of a sodium salt and a potassium salt, heating and agitating the mixture, adding salts of iron and an acid and again agitating, allowing the mixture to rest, and removing the separated values.

2. The process for reducing ores, which consists in subjecting the finely-divided material in the presence of water to the action of a sodium salt and a potassium salt, heating and agitating the mixture, adding salts of iron and an acid and again agitating, allowing the mixture to rest and the values and pulp to separate, precipitating the values upon the pulp, and washing this solid matter.

3. The process for reducing ores, which consists in subjecting the finely-divided material in the presence of water to the action of a sodium salt and a potassium salt, heating and agitating the mixture, adding salts of iron and an acid and again agitating, allowing the mixture to rest and the values and pulp to separate, precipitating the values upon the pulp, draining and cooling this solid matter, and then washing it.

4. The process for reducing ores, which consists in subjecting the finely-divided material in the presence of water to the action of a sodium salt and a potassium salt, heating and agitating the mixture, adding salts of iron and an acid and again agitating, allowing the mixture to rest and the values and pulp to separate, precipitating the values upon the pulp, draining and cooling this solid matter, then washing it, and finally drying it preparatory to smelting.

5. The process for reducing ore, which consists in subjecting the finely-divided material in the presence of soft water to the action of a sodium salt and a potassium salt, heating and agitating the mixture, adding salts of iron and an acid and again agitating, allowing the mixture to rest, and removing the separated values.

6. The process for reducing ore, which consists in subjecting the finely-divided material in the presence of water to the action of ammonia, a sodium salt and a potassium salt, heating and agitating the mixture, adding salts of iron and an acid and again agitating, allowing the mixture to rest, and removing the separated values.

7. The process for reducing ore, which consists in subjecting the finely-divided material in the presence of water to the action of a sodium salt and a potassium salt, heating and agitating the mixture, adding sulfate of iron, iron-water and an acid and again agitating, allowing the mixture to rest, and removing the separated values.

8. The process for reducing ore, which consists in subjecting the finely-divided material in the presence of water to the action of a sodium salt and a potassium salt, heating and agitating the mixture, adding sulfate of iron, iron-water and nitric acid and again agitating, allowing the mixture to rest, and removing the separated values.

9. The process of reducing ore, which consists in subjecting the finely-divided material in the presence of water to the action of ammonia, saltpeter and rock-salt, heating and agitating the mixture, adding sulfate of iron, iron-water and nitric acid and again agitating, allowing the mixture to rest, and removing the separated values.

10. The process of reducing ore, which consists in subjecting the finely-divided material in the presence of water to the action of ammonia, saltpeter and rock-salt, heating and agitating the mixture, adding sulfate of iron, iron-water and nitric acid and again agitating, allowing the mixture to rest and the values and pulp to separate, precipitating the values upon the pulp by agitation, and washing this solid matter.

In testimony whereof I have signed my name to this specification in the presence of two subscribing witnesses.

DENNIS RICHERD ROBERTSON.

Witnesses:
 WILLIAM R. KENNEDY,
 S. C. LYON.